United States Patent [19]
Kramer

[11] Patent Number: 6,014,560
[45] Date of Patent: Jan. 11, 2000

[54] CALL MANAGEMENT SERVICES TO TELEPHONE DEVICES WHICH ARE CONNECTED TO AFIXED WIRELESS ACCESS SUBSCRIBER UNIT

[75] Inventor: Kris William Kramer, Kanata, Canada

[73] Assignee: Nortel Networks Corporation, Montreal, Canada

[21] Appl. No.: 08/777,673

[22] Filed: Dec. 20, 1996

[30] Foreign Application Priority Data

Oct. 25, 1996 [CA] Canada ................................... 2188846

[51] Int. Cl.⁷ .................................................. H04Q 7/22
[52] U.S. Cl. .......................... 455/414; 455/422; 455/462; 455/561
[58] Field of Search ..................... 455/403, 422, 455/414–415, 426, 458, 462, 550, 552, 554, 561, 567, 465; 379/201, 207, 210–212

[56] References Cited

U.S. PATENT DOCUMENTS

| | | | |
|---|---|---|---|
| 4,658,096 | 4/1987 | West, Jr. et al. | 455/74.1 |
| 4,677,656 | 6/1987 | Burke et al. | 455/403 |
| 4,680,785 | 7/1987 | Akiyama et al. | 455/31.2 |
| 4,718,080 | 1/1988 | Serrano et al. | 455/74.1 |
| 4,737,975 | 4/1988 | Shafer | 455/418 |
| 4,775,997 | 10/1988 | West, Jr. et al. | 455/557 |
| 4,890,315 | 12/1989 | Bendixen et al. | 455/554 |
| 4,959,851 | 9/1990 | Tobolski, Jr. et al. | 455/74.1 |
| 5,063,588 | 11/1991 | Patsiokas et al. | 455/31.2 |
| 5,117,450 | 5/1992 | Jogiekar et al. | 455/557 |
| 5,274,699 | 12/1993 | Ranz | 379/142 |
| 5,371,781 | 12/1994 | Ardon | 455/445 |
| 5,475,735 | 12/1995 | Williams et al. | 455/403 |
| 5,483,576 | 1/1996 | Staples | 455/557 |
| 5,544,227 | 8/1996 | Blust et al. | 455/426 |
| 5,724,656 | 3/1998 | Vo et al. | 455/422 |
| 5,742,905 | 4/1998 | Pepe et al. | 455/461 |
| 5,752,195 | 5/1998 | Tusji et al. | 455/462 |
| 5,787,355 | 7/1998 | Bannister et al. | 455/458 |

FOREIGN PATENT DOCUMENTS 0 569 314 A1  11/1993  European Pat. Off. .

OTHER PUBLICATIONS

Aguilera, J.M. Garcia: "Fixed Cellular Access"; 1225 Electrical Communication (1995) 1st Quarter, Paris, FR, Jan. 1, 1995.

(List continued on next page.)

*Primary Examiner*—William G. Trost
*Attorney, Agent, or Firm*—Jeffrey M. Measure

[57] ABSTRACT

A method of providing call management services to a conventional wireline telephony device (or devices) which receive telephony services by means of a fixed wireless access subscriber unit. Such a subscriber unit (SU) includes a wireless transceiver for communicating with a wireless network and a telephone subscriber line interface which connects to a telephone subscriber line to which the telephony devices are connected. Such a subscriber unit is configured to carry out the following steps. Upon receipt of an incoming message (which typically occurs during call set up of an incoming call) subscriber unit evaluates whether call management services information is present, and if so searches the message, according to the wireless protocol for the CMS information and extracts the CMS information. The SU then interprets the received information, determines what information should be passed to the telephony devices to the SU and produces a message containing the relevant information which is then sent to the telephony devices via the telephone subscriber line. The new message may contain information not present in the original incoming message. This new information is retrieved from a user selected directory stored within the SU. The SU may contain a plurality of transceivers and a plurality of subscriber line interfaces wherein said subscriber unit can effectively act as a wireless key system.

34 Claims, 7 Drawing Sheets

OTHER PUBLICATIONS

Wah Hing IP and Fred Halsall: "Cordless Access to the ISDN Basic Rate Service"; UK Teletraffic Symposium, Jan. 1, 1993; Communications Research Group, University of Wales, Swansea SA2 8PP.

Bellcore, Generic Requirements GR–30–CORE, issue 1, Dec. 1994 entitled "LSSGR: Voiceband Data Transmission Interface Section 6.6".

Class$^{SM}$ and Classplus Services Interface Specification, NIS S107–1, Issue 0.2, Sep. 28, 1990.

CALL MANAGEMENT SERVICES TO TELEPHONE DEVICES WHICH ARE CONNECTED TO A FIXED WIRELESS ACCESS SUBSCRIBER UNIT

FIELD OF THE INVENTION

This invention relates to the communication systems which provide analog telephony services via a two-wire analog subscriber line (hereafter referred to as telephone subscriber line) wherein said telephone subscriber line is not connected to a central office switch using the conventional two-wire analog telephone subscriber line interface. In particular, the invention is particularly suited for fixed wireless access (FWA) applications which provide telephony services to conventional telephone devices via a wireless communications link.

This application is related to Pepper, Simulating Changes in Telephone Subscriber Line, filed concurrently herewith, the specification which is hereby incorporated by reference.

BACKGROUND OF THE INVENTION

The use of wireless communication systems to provide telephony service has been seen to provide several advantages over conventional wireline networks. These advantages include speed of deployment, lower cost of installation, and reduced maintenance of outside plant.

Conventional cellular-like terminals can be used for providing fixed wireless access (FWA) as well as conventional mobile cellular telephony. However, in order to reduce costs it is advantageous to use terminals designed for fixed wireless access only. Cost savings can be achieved as such terminals do not require mobility (in the conventional cellular sense) and also can be larger as a result.

To reduce costs further, a fixed wireless access terminal can use existing cellular networks for providing telephony service and hence there is no need to deploy a separate FWA cellular system. Additionally, a FWA terminal can reuse the technology and components originally designed for conventional cellular service.

Systems have been described for interfacing a standard conventional wireline telephone to a radio transceiver to enable such a standard telephone (or other device) to use the cellular network for providing telephony service. Such an interface device for connecting a cellular radio transceiver to a conventional telephony device is not new. For example, U.S. Pat. No. 4,658,096, naming West et al as inventors, describes an interface arrangement for connecting a conventional telephone set to a cellular transceiver such that the cellular network can provide telephony service to such a telephone set. This patent describes an interface which includes means for automatically determining when the user of such a telephone set has finished dialling, as the concept for connecting a telephone to cellular transceiver was known in the "radio-patch" art. The above cited West patent is known in the art, and has been cited many times in subsequent patents dealing with further aspects of connecting a cellular transceiver to a telephony device. Such systems, which may be adequate for providing POTS (plain ordinary telephone service) service, do not adequately support more advanced features, for example, call management services provided by conventional land line networks.

Call management services (hereafter CMS) include, for example, Calling Number Delivery (CND), Message Waiting Indicator, Time of day delivery, Calling Line Identification (CLID), Dialable Directory Number (DN), Reason for Absence of DN, Reason for Redirection, Call Qualifier, Name of Calling Party and Calling Identity on Call Waiting (CIDCW) by means of messages sent to a telephone unit. CLASS$^{SM}$ (Bellcore trademark) which is compliant with GR-30-CORE (TR-NWT-000030), LSSGR: Voiceband Data Transmission Interface (hereby incorporated by reference, along with cited documents) is a known format for sending such messages. Using this method, the central office switch, with the aid of an appropriately configured subscriber line interface circuit, is able to send information to subscribers using some form of data modulation scheme. Of course other types of protocols can be used, and in this specification we will generally refer to these services as call management services.

Furthermore, advanced cellular systems, for example, IS54B, April 1992, EIA/TIA Cellular System Dual-Mode Mobile Station—Base Station Compatibility Standard (hereby incorporated by reference), also provide call management services/features. Thus, suitably equipped cellular terminals compatible with IS54B can receive and display, call management services information. However, the wireless protocols are not compatible with the land line call management services protocols. Thus, there exists a need for providing call management services features to a standard telephone which is coupled, via a suitable interface, to a wireless network.

SUMMARY OF THE INVENTION

One aspect of the invention provides for a method of providing call management services to a conventional wireline telephony device (or devices) which receive telephony services by means of a fixed wireless access subscriber unit. Such a subscriber unit (SU) includes a wireless transceiver for communicating with a wireless network and a telephone subscriber line interface which connects to a telephone subscriber line to which the telephony devices are connected. Such a subscriber unit is configured to carry out the following steps. Upon receipt of an incoming message (which typically occurs during call set up of an incoming call) the subscriber unit evaluates whether call management services information is present, and if so searches the message, according to the wireless protocol for the CMS information and extracts the CMS information. The SU then interprets the received information, determines what information should be passed to the telephony devices to the SU and produces a message containing the relevant information which is then sent to the telephony devices via the telephone subscriber line. According to a preferred embodiment, the new message may contain information not present in the original incoming message. This new information is retrieved from a user selected directory stored within the SU. According to another embodiment of the invention the SU may contain a plurality of transceivers and a plurality of subscriber line interfaces wherein said subscriber unit can effectively act as a wireless key system.

BRIEF DESCRIPTION OF THE DRAWINGS

The present invention, together with further objects and advantages thereof will be further understood from the following description of example embodiments with reference to the drawings in which.

DETAILED DESCRIPTION OF THE PREFERRED EMBODIMENT

The present invention will be described with respect to a preferred embodiment used in a fixed wireless access system. It should be appreciated by a person skilled in the art that the invention can also be utilized in other types of systems, for example, fiberoptic, cable TV, etc. which provide telephony services by some means other than a telephone subscriber line connected to a central office switch using the conventional two-wire analog telephone subscriber line interface.

Figure 1:
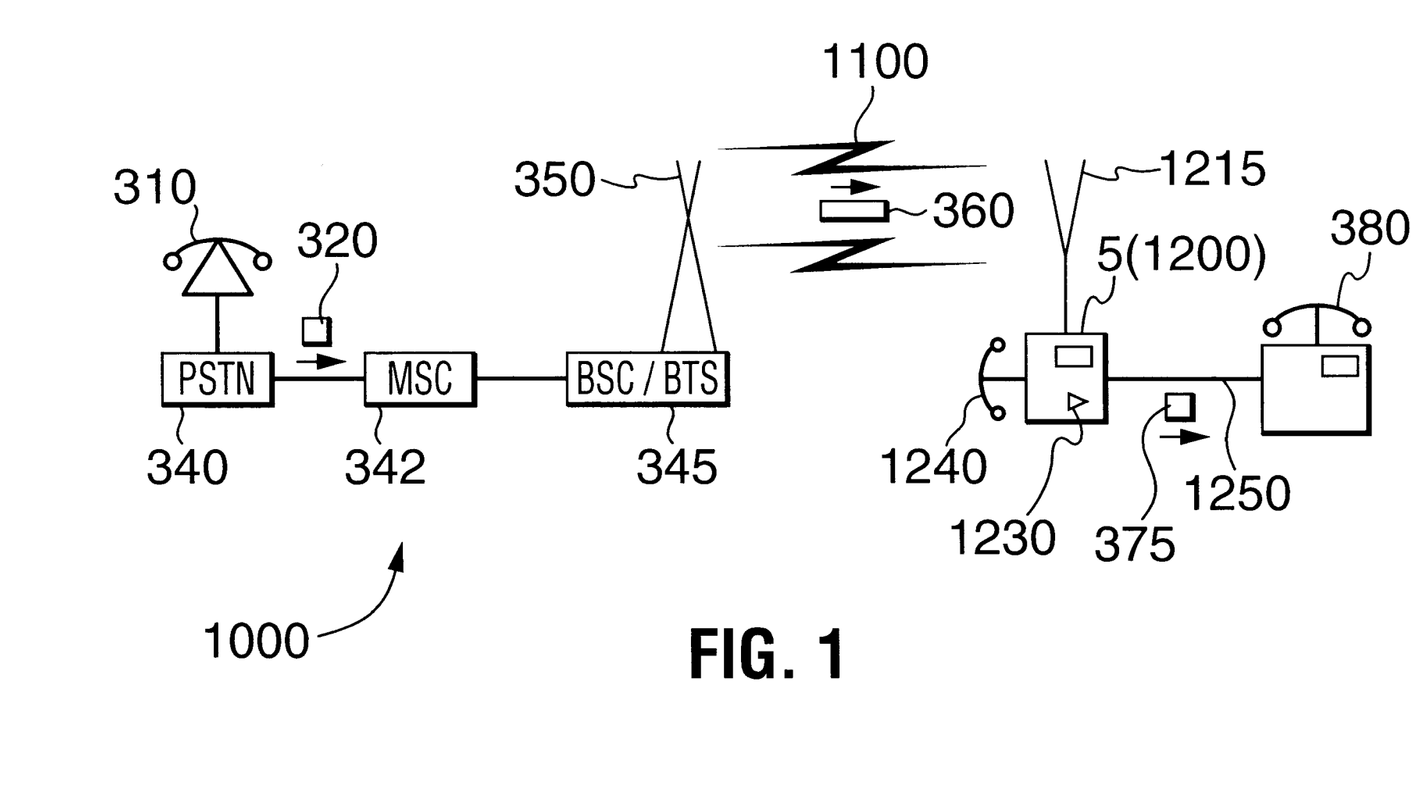
FIG. 1 is a schematic representation illustrating how a wireless communication network can provide call management services information to conventional telephone sets according to a preferred embodiment of the present invention.

By way of example, FIG. 1 illustrates a communications network 1000 which in this example includes a wireless base station which communicates by a medium 1100, which in this example is a suitable radio frequency interface (e.g., IS54B), with a subscriber unit (SU) 1200. Subscriber unit 1200 includes a communication interface which communicates with the communication network 1000 via the medium 1100. In this example, communication interface comprises a radio transceiver and antenna 1215 for communicating using IS54B protocols with base station 345. Subscriber unit 1200 also includes terminal unit which includes a primary handset 1240 and a SLIC 1230 which connects to telephone subscriber line 1250 which connects to telephone 380. Additional telephony devices (not shown) can be connected to the line 1250. Telephone subscriber line 1250 can include wiring within a building, extension wires, or a combination thereof.

FIG. 1 also illustrates an example of the SU 1200 receiving a call from a telephone connected to the PSTN. In this example a telephone 310 connects with a PSTN Central Office 340 which in turn is coupled to an MSC 342 which is coupled to a base transmitter station BTS (in this example via a BSC 345) which transmits via antenna 350. Subscriber unit 1200 is coupled to a conventional telephone set 380 which supports call management services features.

In operation central office 340 sends call management services information to the MSC 342 about telephone 310 when telephone 310 attempts to place a call to subscriber unit 1200. This information 320 is formatted according to the specific trunk protocol used to connect the PSTN 340 to the MSC 342. This information is translated from the trunk protocol to the IS54B protocol by the MSC 342. The information in IS54B form is then transmitted, as shown at 360 in the form of an "alert with info" message sent over the radio link from the base station to the subscriber unit after completion of the paging process. The SU 1200 receives the IS54B coded message over the air interface and then decodes said message to extract the desired call management services information (e.g. calling party number). This decoding process is performed by the baseband microcontroller 90 and sent to the VF microcontroller 180 in an intermediate format (as described below). The VF microcontroller then carries out several central office functions as will be described below in order to send a CLASS message 375 during the silent interval between the first ringing period and the second ringing period to the telephone 380. The conventional (but CLASS enabled) telephone 380 then receives and displays the Call management services information in the same manner as if the telephone 380 was attached to a central office via a conventional two-wire analog telephone subscriber line interface.

Thus, the terminal has in effect recoded the call management services information contained in the IS54B messaging protocol into an actual CLASS message (e.g., a Bellcore GR-30-CORE compliant format) and then sent that CLASS message to the extension telephone via the RJ-11 jack 230.

Figure 2:
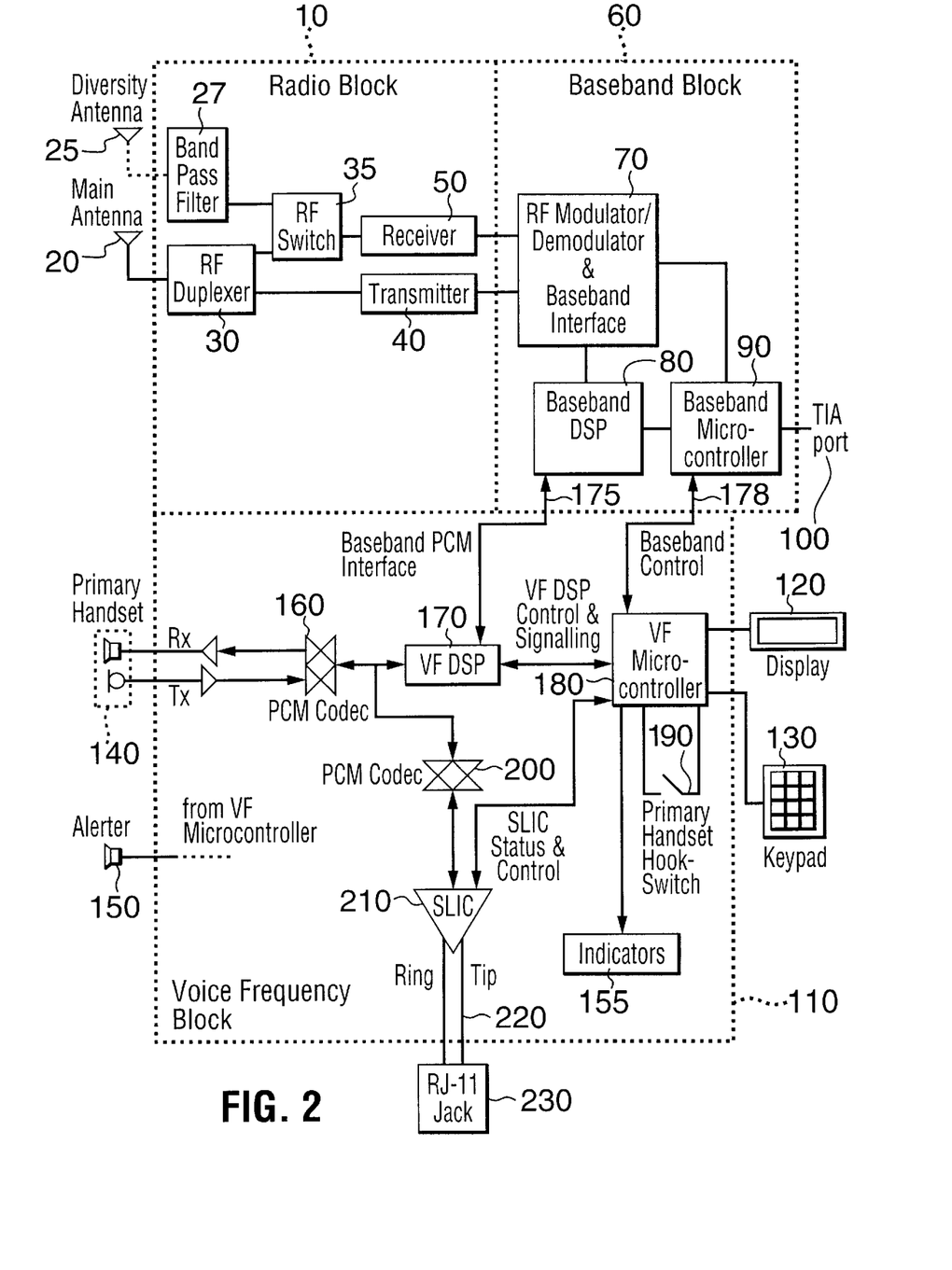
FIG. 2 is a block diagram showing the architecture of a subscriber unit according to a preferred embodiment of the invention.
Figure 3:
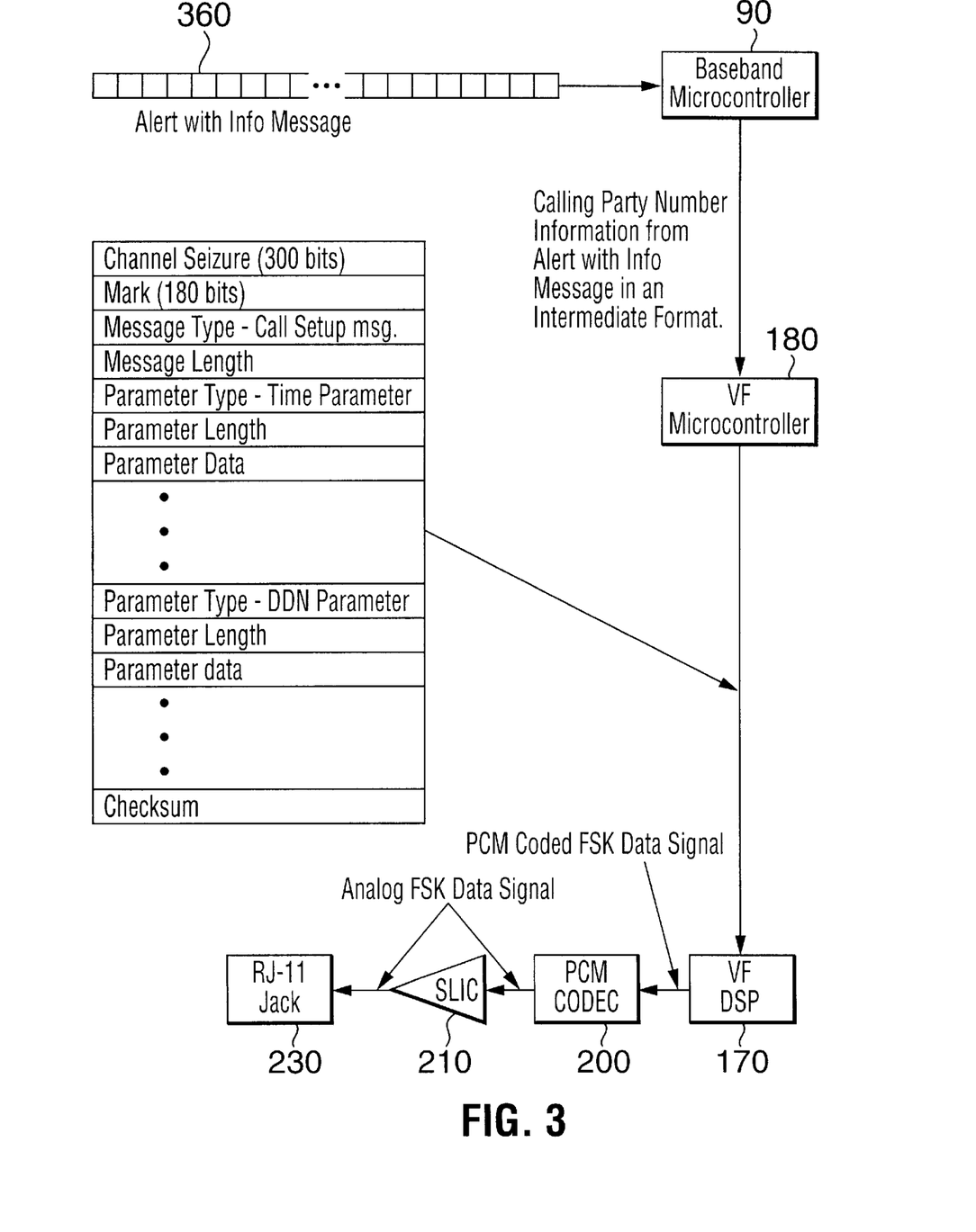
FIG. 3 is a schematic representation of the message flow between components of the subscriber unit.

A subscriber unit 1200 according to a preferred embodiment of the invention is shown in FIG. 2 wherein the communications interface comprises a radio block 10 and a baseband block 60, and the subscriber unit also comprises a voice frequency block 110. There are two interfaces between the baseband block 60 and the voice frequency block 110. The first interface, called the PCM interface 175 comprises the digitized voice frequency pulse code modulation (PCM) transmit and receive signals, while the second interface is a bi-directional serial communications interface 178. The radio block 10 and the baseband block 60 provide the conversion between the radio frequency and digitized voice frequency signals. The baseband block 60 is also responsible for handling the protocols associated with the RF link (e.g. IS54B) under the control of the voice frequency block 110.

The voice frequency block 110 includes a primary user interface which includes a display 120 for displaying, for example calling line ID, a keypad 130, an alerter 150 which produces an audio alert (e.g., ringing), an indicator which provides visual alerts (e.g., a light indicator indicating, for example, that an extension is off hook or that an incoming call has been received), and a primary handset 140. The voice frequency block 110 also includes a secondary user interface including RJ-11 jack 230 which acts as an extension jack for standard analog telephony devices. Note that an additional data jack for a peripheral device, for example, a facsimile or modem device can be supported.

Not shown is a suitable DC power source. This can comprise a battery, or a suitable AC power adapter, or preferably a combination of the two where ordinarily power is provided from an AC main with battery power as a backup.

The voice frequency (VF) microcontroller 180 controls call processing via input from the baseband block 60, the primary hook switch 190, the keypad 130, the VF DSP 170, and the subscriber line interface circuit (SLIC) 210. The VF microcontroller controls call processing via control of the baseband block 60, the display 120, the alerter 150, the VF DSP 170, and the SLIC 210. The VF microcontroller includes a microprocessor and associated memory. The Mitsubishi M37510 is a suitable VF microcontroller. The VF microcontroller 180 communicates with the VF DSP 170 using a bi-directional serial communications interface. The VF DSP 170 primarily provides the interface of the digitized voice frequency transmit and receive signals between two pulse code modulation (PCM) coder/decoders (CODEC) 160 and 200 and the baseband PCM interface. The Analog Devices ADSP-2163 is a suitable DSP. PCM CODEC 160 provides suitable analog to digital and digital to analog conversion between the primary handset 140 and the VF DSP 170. Likewise, the PCM CODEC 200 provides suitable analog to digital and digital to analog conversion between the extension devices via the SLIC 210 and the VF DSP 170.

The SLIC 210, which for example can include an Advanced Micro Devices AM79R79 SLIC chip, provides central office subscriber line interface features to extension devices connected to the RJ-11 jack 230, via the tip and ring terminals. For example, the SLIC provides over-voltage protection, DC power (battery feed), the hybrid function (2 wire-4 wire interface), ringing voltage, supervision (off hook detection), on-hook transmission etc.

In operation, a communication signal is received at both the main antenna 20 and the diversity antenna 25, where the signal is suitably filtered either by the RF duplexer 30 or the band pass filter 27 respectively. The RF switch 35 determines which of the signals are downconverted by the receiver block 50 based on suitable diversity selection process.

The selected signal is downconverted to a suitable IF signal by the receiver block 50. The receiver block 50 also measures the received signal strength and sends a message to the RF demodulator and baseband interface block 70 as to the received signal strength indication (RSSI) as is known in the art. The RSSI is then sent to the baseband microcontroller 90. The baseband DSP 80 also determines the bit error rate (BER) which is also forwarded to the baseband microcontroller.

The baseband microcontroller 90 is used to process layers 1 to 3 of the communication protocol stack (e.g. IS54B), to manage the control of the RF radio block 10 and the baseband block 60, to process OA&M requirements and also carries out some user interface functions via commands received from the VF microcontroller 180. These user interface functions, for example, include received signal strength indication (RSSI) measurements and DTMF/call progress tone generation.

Additionally, during reception of an incoming call, baseband microcontroller 90 decodes the IS54B "Alert With Info" message, pulls out the relevant class management services information bundles (e.g., calling party number) and forwards this to the VF microcontroller 180 in a suitable intermediate messaging format which the VF microcontroller 180 uses to generate the CLASS calling line identification information packet. The baseband microcontroller 90 decodes other IS54B messages in a similar way to provide information for other CLASS features such as message waiting notification.

Upon receipt of an incoming call notification message from the baseband microcontroller 90 the voice frequency microcontroller 180 sends an alert signal to the alerter 150, activating the alerter for producing ringing at the primary handset. The VF microcontroller 180 also passes control information to the VF DSP 170 which in turn is connected to the SLIC chip 210 which generates ringing voltage the telephone subscriber line via extension voice jack 230. The VF microcontroller 180 controls the user interface (e.g. ring cadence), while the VF DSP 170 performs simple tasks based on commands from the VF microcontroller 180.

As will be discussed in more detail, when the VF microcontroller 180 receives the decoded call management services information bundles from the baseband microcontroller 90, the VF microcontroller 180 converts this information into the format used by the extension telephone 380, for example, a CLASS formatted message which in this example is then frequency shift keying (FSK) modulated by the VF DSP 170 for providing CLASS information to the extension device. This CLASS calling line identification information is sent to the extension devices, preferably during the silent interval between the first and second ring signals in accordance with GR-30-CORE.

Figure 4A:
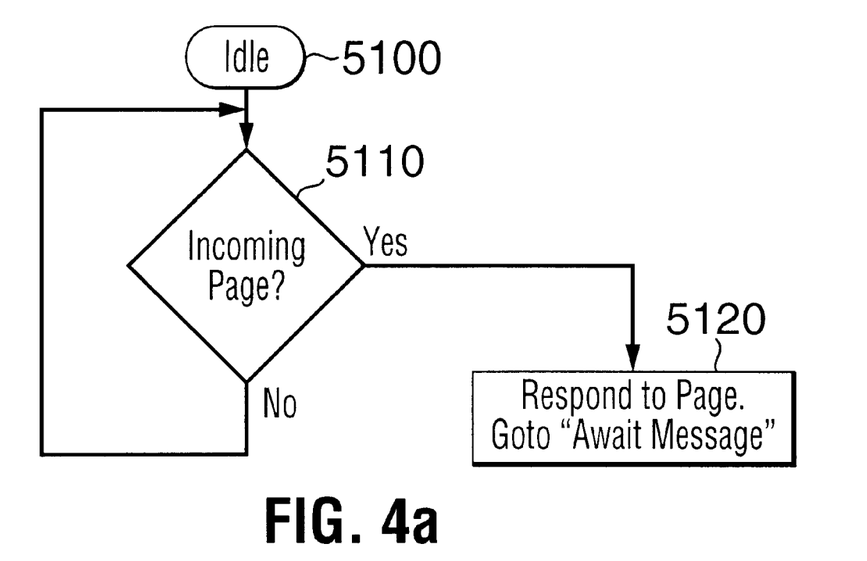
FIG. 4 is a flow chart illustrating the steps carried out by the baseband microcontroller according to a preferred embodiment of the present invention.
Figure 4B:
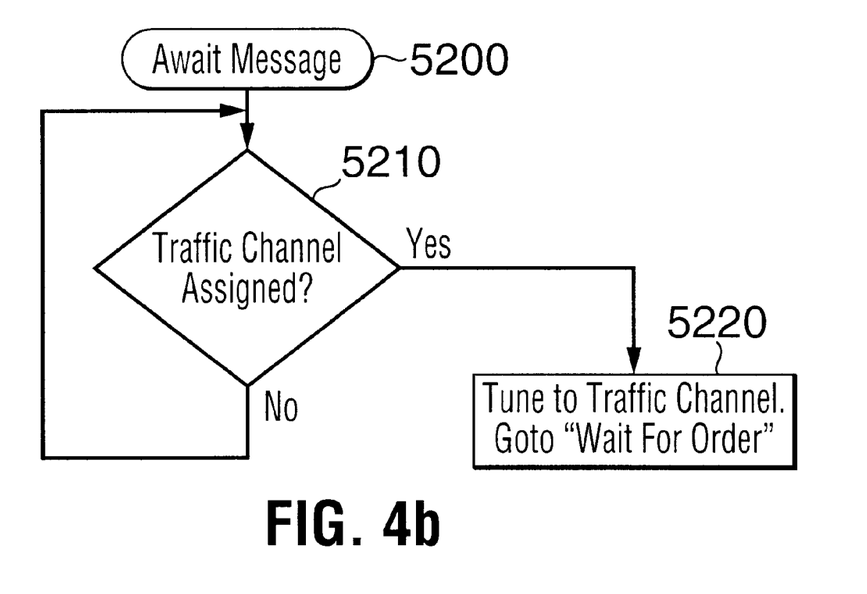
Figure 4C:
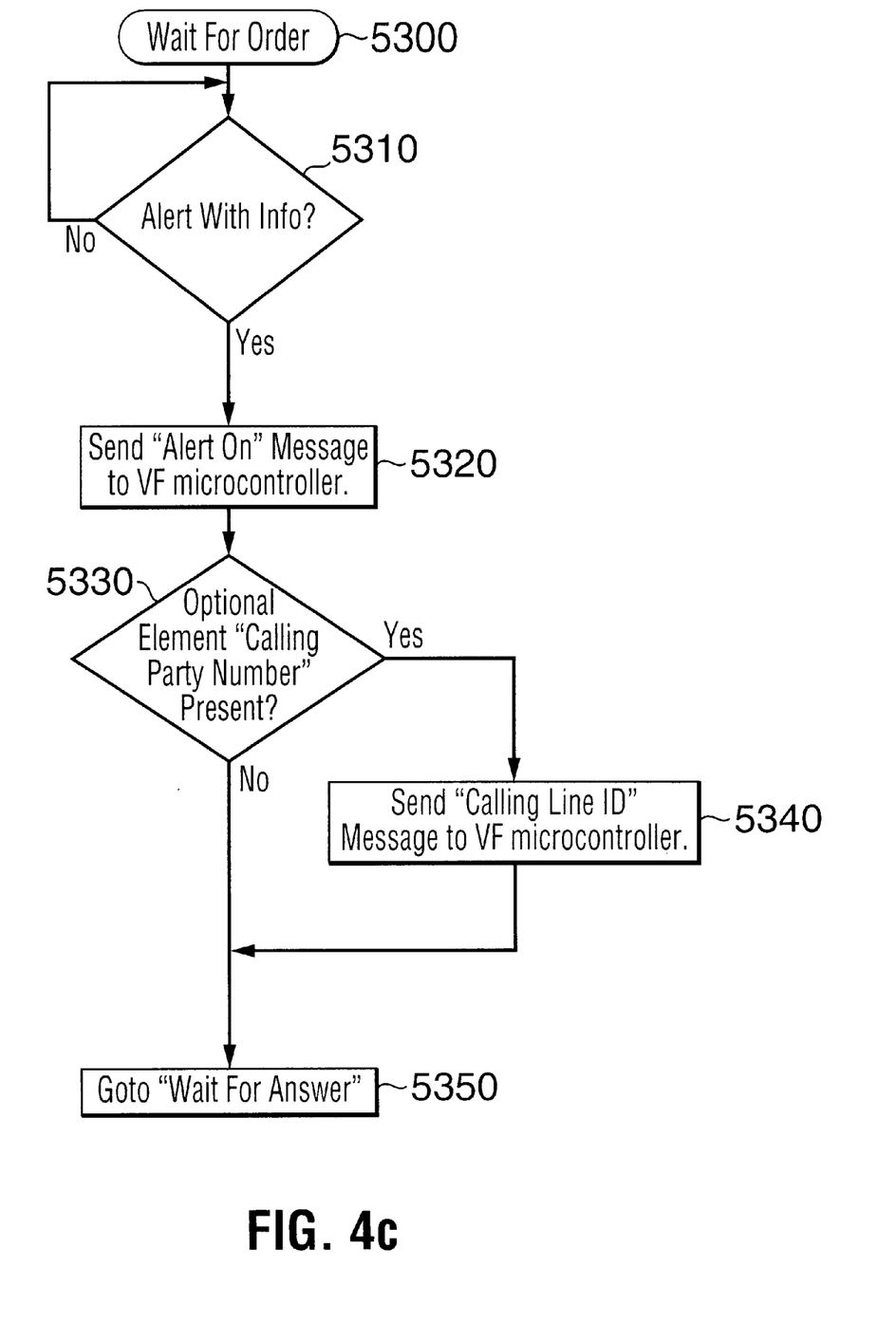
Figure 5A:
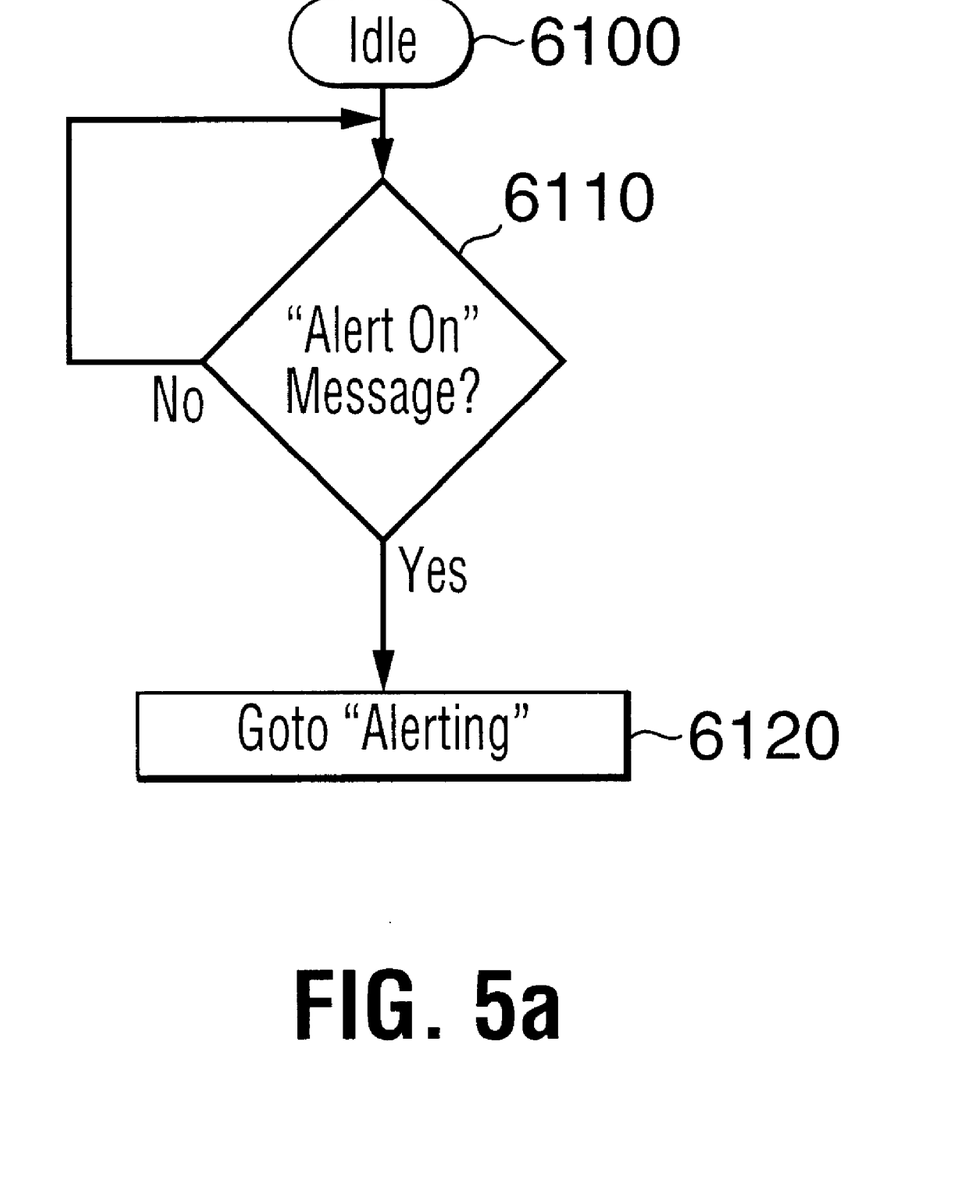
FIG. 5 is a flow chart representing the steps carried out by the voice frequency microcontroller according to a preferred embodiment of the present invention.
Figure 5B:
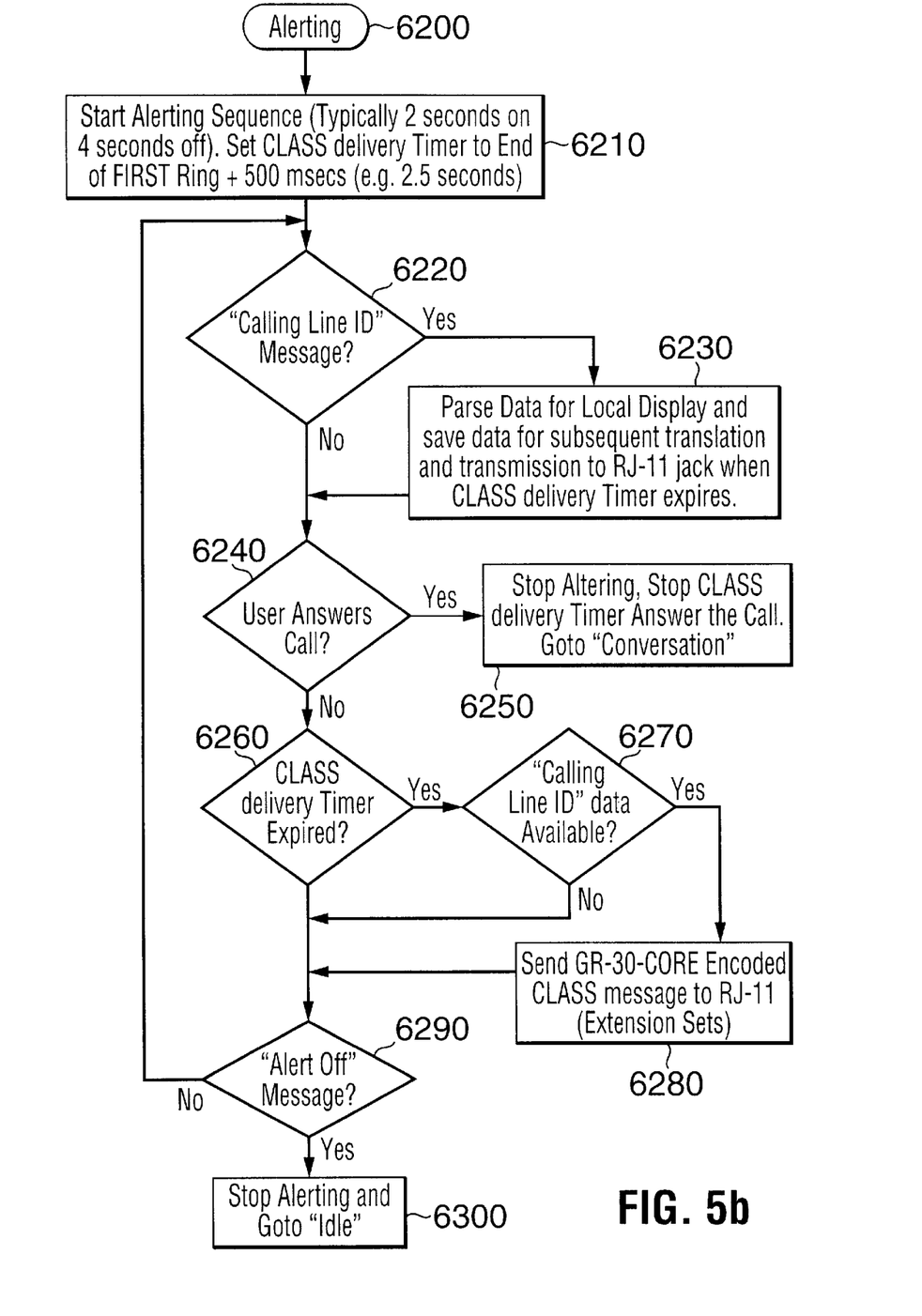

We will now look at a more detailed example of how SU 1200 applies the above described method, with reference to FIGS. 3, 4a, 4b, 4c, 5a and 5b. FIGS. 4a, 4b and 4c show the processing steps applied by the baseband microcontroller 90, while FIGS. 5a and 5b show the processing steps applied by the VF microcontroller. It should be appreciated by a person skilled in the art that these figures are for illustrative purposes only and that they do not attempt to cover all of the state transitions or actions performed while receiving an incoming call in an IS54B environment. As well, this example only covers the situation where the incoming call is assigned to a digital traffic channel. A similar method is also employed when the incoming call is assigned to an analog voice channel.

Referring to FIGS. 4a, 4b and 4c, the baseband microcontroller 90 will start in the "Idle" state 5100. Once a successful page is received from the network 5110, the baseband microcontroller 90 acknowledges the page 5120 and enters the "Await Message" state 5200. Once in the "Await Message" state 5200, the system will assign a traffic channel 5210 to the SU 1200, to which the baseband microcontroller 90 will tune 5220 and then move to the "Waiting for Order" state 5300 mode. While in the "Waiting for Order" state 5300 the SU waits for the network to send a forward digital traffic channel message, e.g., "Alert with Info" message 5310 (also shown as 360 in FIG. 3). When the SU 1200 receives this "alert with info" message, the baseband microcontroller 90 sends an "Alert On" message 5320 to the VF microcontroller 180. The baseband microcontroller 90 then checks to see if the "Alert with Info" message contains the "Calling Party Number" optional information element 5330 about terminal 310. The optional information element is optional as it is typically only sent in the "alert with info" message if the user of SU 1200 subscribes to the appropriate network services. For the purposes of this example, it is assumed that the optional information element is sent in the "alert with info" message. If no "Calling Party Number" is available, the baseband microcontroller 90 is finished with the processing of the "alert with info" message and it advances to the "Wait for Answer" state 5350. If "Calling Party Number" is available, the baseband microcontroller 90 decodes and forwards this information in an intermediate format to the VF microcontroller 180 in a "Calling Line ID" message 5340. In this embodiment, the baseband microcontroller 90 performs no special mapping functions in translating the "Calling Party Number" information into the intermediate format for the VF microcontroller 180. Rather, the baseband microcontroller looks at incoming bit stream containing the calling party number, extracts the appropriate bits and then reformats the bits into a byte oriented message which is then forwarded to the VF microcontroller. It is the responsibility of the VF microcontroller 180 to provide the necessary translations to convert the "Calling Party Number" information into a valid CLASS message. The details of the intermediate message format and the rules applied to translate from "Calling Party Number" to CLASS (GR-30-CORE) will be described in detail below. The baseband microcontroller 90 sends an "alert on" message whenever it receives the "alert with info" message over the radio link. It will only send the "calling line id" message if the optional information element "Calling Party Number" is received.

Referring to FIGS. 5a and 5b, the VF microcontroller 180 starts in its initial "Idle" state 6100. The VF microcontroller 180, upon receiving the "Alert On" message 6110, advances to the "Alerting" state 6120. The VF microcontroller 180 enters the "Alerting" state 6200 and starts the normal ring timing sequence which alerts the user to an incoming call (typically 2 seconds on, 4 seconds off) and starts a "CLASS Delivery Timer" 6210 to determine when to send the CLASS encoded information to the RJ-11 interface. The "CLASS Delivery Timer" is set to timeout at the end of the first ring signal plus 500 msecs. The intent is to send the CLASS message burst to the extension set in the silent interval between the first and second ring signal, at least 500 msecs after the end of the ring tone in accordance with GR-30-CORE. While in the "Alerting" state, four different events may occur. The VF microcontroller 180 may receive a "Calling Line ID" message, the user may answer the call, the far end calling party may release the call which would result in an "Alert Off" message or the "CLASS Delivery Timer" may expire. The following describes how each event is handled.

In this embodiment, the VF microcontroller 180, upon receiving the "calling line id" message 6220, decodes the information (e.g., calling number and/or calling name or private number etc.) and displays this information on the primary display 120 as shown at 6230. It also saves this data for subsequent translation into a CLASS encoded message and transmission to the extension sets should the CLASS Delivery Timer expire. If the user of the SU 1200 answers the call 6240, the VF microcontroller 180 stops the CLASS Delivery Timer and goes to the "Conversation" state 6250. If the CLASS Delivery Timer expires 6260, the VF microcontroller 180 verifies that it has valid "Calling Line ID" data available 6270. If no data is available, no actions are performed. If data is available, the VF microcontroller 180 performs the CLASS message coding and assembly as discussed in more detail below and sends a multiple data message format message on to the VF DSP 170 which FSK modulates the microcontroller data, establishes the correct signal amplitude, all according to Bellcore GR-30-CORE, and then sends the FSK modulated message to the SLIC for transmission to the extension 6280. In this embodiment, the VF microcontroller 180 controls all aspects of the transmission except for the actual data modulation. That is, the VF microcontroller 180 specifies the amplitude of the modulated signal to use for transmission, what timing parameters to use, when to generate the signal as well as the proper coding of the information including checksums. Finally, if the VF microcontroller 180 receives an "Alert Off" message 6290, this is an indication that the call has been released. The VF microcontroller 180 then stops alerting the user and goes back to the Idle state 6300.

It should be noted that if the SU 1200 is in the "Conversation" task, a "Flash with Info" message can be received if the SU 1200 user is a call waiting subscriber.

As stated, the baseband microcontroller 90 is responsible for processing layers 1 to 3 of IS54B. The messages of IS54B, for example "alert with info", are sent in a bit packed format. When translating the "alert with info" message from IS54B to the intermediate format, the baseband microcontroller 90 extracts the relevant bits from the "calling party number" information bitstream and rebundles them into a byte oriented protocol suitable for the VF microcontroller 180 to process. The baseband microcontroller 90 forwards the following pieces of information (sent in the "calling party number" field of the "alert with info" message as described in the IS54B specification):

Screening Indicator bits
Presentation Indicator bits
Type of Number
Numbering Plan Identification
Character(s)

Note that there may be two instances of "calling party number" in the "alert with info" message in which case the baseband microcontroller 90 would send two bundles of information as specified above. Also, it should be appreciated by a person skilled in the art that a similar message could be received when the SU 1200 is sent a "flash with info" message for implementing such features as CIDCW for example. The above parameters are coded as follows (as described in the IS54B specification).

The Screening Indicator bits (SI bits) are defined as:

| Code | Description |
| --- | --- |
| 00 | User-provided, not screened. |
| 01 | User-provided, verified and passed. |
| 10 | User-provided, verified and failed. |
| 11 | Network-provided. |

The Presentation Indicator bits (PI bits) are defined as:

| Code | Description |
| --- | --- |
| 00 | Presentation allowed. |
| 01 | Presentation restricted. |
| 10 | Number not available. |
| 11 | Reserved. |

The Type of Number bits are defined as:

| Code | Description |
| --- | --- |
| 000 | Unknown. |
| 001 | International number. |
| 010 | National number. |
| 011 | Network-specific number. |
| 100 | Subscriber number. |
| 101 | Reserved. |
| 110 | Abbreviated number. |
| 111 | Reserved for extension. |

The number Plan Identification bits are defined as:

| Code | Description |
| --- | --- |
| 0000 | Unknown. |
| 0001 | ISDN/Telephony numbering plan (CCITT E.164 and E.163). |
| 0011 | Data numbering plan (CCITT X.121). |
| 0100 | Telex numbering plan (CCITT F.69). |
| 1001 | Private numbering plan. |
| 1111 | Reserved for extension. |
| | All other values reserved. |

When the VF microcontroller 180 receives the "Calling Line ID" message from the baseband microcontroller 90, it decodes and maps the IS54B supplied information into appropriate CLASS information. This CLASS message includes a time parameter (which the SU 1200 obtains from its internal clock (not shown)), either the dialable DN (DDN) of the calling line or the Reason for Absence of DN (e.g. "Private Number" or "Out of Area"), and the name parameter if either the same information is sent over the cellular infrastructure or an incoming preferred name match occurred (explained below). The VF microcontroller 180 encodes the CLASS message using the "multiple data"

messaging format, specifically the "call set up" message, and includes the appropriate fields as stated above (e.g. Time, DDN, Name, Reason for Absence of DN). These parameters are defined in GR-30-CORE or documents cited therein. In the preferred embodiment, the following rules are applied by the VF microcontroller to determine what information to send in the CLASS encoded (GR-30-CORE) message. Note that in the preferred embodiment, the VF microcontroller does not process the SI bits, the Type of Number bits or the Numbering Plan Identification bits.

The VF microcontroller 180 interprets the PI bits as follows:

If "presentation is allowed", interpret the rest of the data (e.g. the characters) as specified below.

If "presentation is restricted", send a CLASS call set up message to the extensions encoded as Reason for Absence=Private Number, Time=Current local Set Time/Date (no DDN, no Name etc.).

If "number is not available", send a CLASS call set up message to the extensions encoded as Reason for Absence=Out of Area, Time=Current local Set Time/Date (no DDN, no Name etc.).

If "presentation is reserved" ignore any additional information in the remaining fields. Don't send any CLASS information to the extensions.

The CLASS messaging protocol provides well defined fields for calling line identification such as Calling Number Delivery (CND), Time of day, Calling Line Identification (CLID), Dialable Directory Number (DN), Reason for Absence of DN, Reason for Redirection, Call Qualifier and Name of Calling Party. IS54B, however, does not provide such unique qualifiers. Instead IS54B provides the SI, PI, Type of Number and Number Plan Identification bits and "characters". The characters can be digits, for example the directory number (DN) of the calling party or possibly an ASCII encoded name for example. The VF microcontroller 180 must therefore apply several rules to the "character" information to determine what to send to the extension sets. There are essentially three cases to consider: 0, 1 and 2 instances of "calling party number".

Case 1: Zero instances of "calling party number" information is received.

Discard all information and do not send CLASS information to extension sets.

Case 2: One instance of "calling party number" information is received.

Examine the PI bits and handle as specified above.

If PI bits are "presentation allowed" continue.

If all characters are "digits" (0, 1, . . . , 9), treat the information as DDN and perform preferred name matching (described below). If preferred name matching passes, send a CLASS call set up message with DDN=characters (digits) received, Name=output of preferred name match and Time=Current local Set Time/Date.

If the above test fails, treat the information as "Name", send a CLASS message with Name=characters received and Time=Current local Set Time/Date (no DDN or Reason for Absence).

Case 3: Two instances of "calling party number" information is received.

Examine the PI bits and handle as specified above.

If PI bits are "presentation allowed" continue.

If all characters of first instance are "digits" (0, 1, . . . , 9), treat the information as DDN, second instance shall automatically be treated as "Name". Perform an incoming preferred name match and if the name match passes, replace instance 2 with the preferred name.

Send a CLASS message with DDN=characters (digits) received from instance 1, Name=instance 2 (or output of preferred name match) and Time=Current local Set Time/Date.

If the above test fails, i.e. the first instance is not "digits" only, log first instance as Name then check second instance. If all characters of second instance are mdigitsm (0, 1, . . . , 9), treat the second instance as DDN. Perform an incoming preferred name match on the second instance and if the name match passes, replace instance 1 with the preferred name. Send a CLASS message with DDN=characters (digits) received from instance 2, Name=instance 1 (or output of preferred name match) and Time=Current local Set Time/Date.

If the above test fails, i.e. the second instance is not "digits" only, discard second instance. Send a CLASS message with Name=instance 1 and Time=Current local Set Time/Date (no DDN or Reason for Absence).

In order to send this CLASS message to the extension sets, the VF microcontroller 180 encodes each parameter (DDN, Time, Name, Reason for Absence) including lengths and checksums. Additionally the VF microcontroller formats the message to provide proper conditioning as specified in GR-30-CORE, for example channel seizure and mark signal. The resultant output of the modulator is presented in FIG. 3. The resultant data is then sent to the VF DSP 170 where the FSK message stream is transmitted in the silent interval between the first and second ringing sequence which the SLIC applies to the telephone subscriber line.

In this context the Fixed Wireless Telephone can be viewed as the Stored Program Controlled Switching System (SCPS) and the extension telephone as the Customer Premises Equipment (CPE) since the central office CLASS messaging delivery function has been effectively moved over to the subscriber unit.

Preferably the subscriber unit 1200 has local features for customizing the terminal for the user. For example, the SU 1200 primary interface includes several personalized memory dialer keys and provides the user with the ability to program a personalized directory of directory numbers (DN) and Names associated with each DN. The name is programmed by the user of the SU 1200 and can be any name chosen by the user, i.e. it is the preferred name for the called party of the associated DN. This name is presented to the user (via the display 120) when the user of the SU 1200 sets up a call from the directory or memory dialer. Many wireless networks, which deliver the DN of the calling party, do not deliver the Name of the calling party. To enhance the usefulness of this unit, the VF microcontroller 180 preferably performs an incoming name match of the delivered DN (if available). The VF microcontroller does this by comparing the incoming DN (sent in the IS54B "alert with info" message) with each DN in the directory and the memory keys until either an identical match is found or all entries have been compared and failed. If a match between the incoming calling party number and a directory entry number or memory dialer number is made, the VF microcontroller 180, uses the associated name of the matching entry as the "preferred" name to display locally (on display 120) and to send as a "Name" parameter in the CLASS message directed to the extension. This preferred name will either replace any name that was sent in the "alert with info" message, or it will add a name when none was sent.

It should be noted that other components and features of the SU may be included but have not been described. For example, the hardware of the SU according to a preferred embodiment also includes the capability for tip and ring reversal control, tip and ring open circuit control, on-hook and off-hook transmission capability, dual tone multifrequency (DTMF) generation and detection capability as well as some form of data modulation/demodulation.

It should be appreciated by a person skilled in the art that several modifications could be made to the above embodiment. The preferred embodiment uses two microcontrollers, one for processing layers 1 to 3 of IS54B and one for controlling the VF section. It is possible to combine both processors and perform all tasks in the one controller. Also, there is no need for the SU 1200 to be a combined handset and SLIC. The invention could also be implemented in a system which provides no primary user interface (e.g. no local handset), i.e. a box that provides wireless to SLIC access only. In such a system the user must attach an external telephone device (to the SLIC) to get telephony service.

The preferred embodiment describes the method of converting IS54B to CLASS (GR-30-CORE). In general, similar methods could be employed to convert other radio technologies (e.g. IS95, . . . ) or other access technologies (e.g. cable connection to PSTN instead of wireless). Similarly, the CLASS messaging could be replaced with other forms of CMS delivery to two-wire analog subscriber lines which utilize such things as tone signalling, modulation techniques and tip/ring reversal or open switch interval (OSI) signalling. For such systems the following, e.g., tip and ring open circuit control, on-hook and off-hook transmission capability, dual tone multi-frequency (DTMF) generation and detection capability as well as some form of data modulation/demodulation may be required. Additionally, although CLASS calling line identification has been described above, other CLASS features can be implemented for example using the IS54B message waiting signalling (contained in "mobile station control" and "flash with info" messages) to deliver CLASS message waiting to the extension sets.

Furthermore, the preferred embodiment uses the multiple data message format for delivering Call Setup information. This could be implemented using, for example, single data message format with Calling Number Delivery or Message Waiting Indicator. Also, although the SU 1200 has an RJ-11 jack, other coupling jack arrangements can be used.

Numerous modifications, variations and adaptations may be made to the particular embodiments of the invention described above without departing from the scope of the invention, which is defined in the claims.

I claim:

1. A method of providing call management services to a telephone subscriber line coupled to a fixed wireless access subscriber unit, said subscriber unit comprising a controller, at least one wireless receiver for communicating with a wireless network according to a wireless protocol and at least one telephone subscriber line interface for coupling to at least one telephone subscriber line, said method comprising the steps of:

a) receiving a message by said receiver containing call management services (CMS) information according to said wireless protocol;

b) translating said CMS information into a format recognizable to a telephony device coupled to said telephone subscriber line; and c) sending a signal including said translated CMS information to said telephone subscriber line.

2. The method as claimed in claim 1 wherein step (a) further comprises the steps of:

receiving a call set up message; and evaluating said call set up message for the presence of CMS information.

3. The method as claimed in claim 1 wherein step (b) further comprises the steps of:

extracting said CMS information from said received message;

interpreting said CMS information; and encoding said information into a new message in said format.

4. The method as claimed in claim 3 wherein said received message includes at least one calling party number field, said interpreting step comprising the steps of evaluating the number of calling party number fields, and the content of each calling party field, and determining the identific ation information to be encoded.

5. The method as claimed in claim 4, wherein said subscriber unit stores user selected information to be displayed for preselected calling parties, and wherein said determining the identification information to be encoded includes selecting the user selected information to be encoded when the content of a calling party field corresponds to a preselected calling party.

6. The method as claimed in claim 1 wherein step (c) comprises FSK modulating a signal sent to said telephone subscriber line with said CMS information.

7. The method as claimed in claim 5 wherein said subscriber unit sends a signal to said telephone subscriber line including first and second ringing bursts when said message is received and wherein step (c) comprises FSK modulating a said signal with said CMS information between said first and second ringing bursts.

8. The method as claimed in claim 3, wherein the said new message further comprises information obtained internally from the said subscriber unit.

9. The method as claimed in claim 8, wherein the said information obtained internally from the said subscriber unit comprises a time parameter.

10. The method as claimed in claim 9, wherein said received message includes at least one calling party number field, said interpreting step comprising the steps of evaluating the number of calling party number fields, and the content of each calling party field, and determining the identification information to be encoded.

11. The method as claimed in claim 10, wherein said information obtained internally from the said subscriber unit comprises user selected information to be displayed for preselected calling parties, and wherein said determining the identification information to be encoded includes selecting the user selected information to be encoded when the content of a calling party field corresponds to a preselected calling party.

12. A method of providing call management services to a telephone subscriber line coupled to a subscriber unit, said subscriber unit comprising a controller, at least one communications interface for communicating with a communications network and at least one telephone subscriber line interface, said method comprising the steps of:

a) receiving a message containing coded information by said communications interface from said communications network;

b) translating said coded information into a format recognizable to a telephony device coupled to said telephone subscriber line; and c) sending a signal including said translated coded information to said telephone subscriber line.

13. The method as claimed in claim 12 wherein step (b) further comprises the steps of:
   extracting said coded information from said received message;
   interpreting said coded information; and
   encoding said information into a new message in said format.

14. The method as claimed in claim 13, wherein said subscriber unit stores user selected information to be displayed for preselected calling parties, and wherein said interpreting step includes evaluating said coded information to determine the calling party and selecting the user selected information to be encoded when the content of a calling party field corresponds to a preselected calling party.

15. The method as claimed in claim 12, wherein said new message further comprises information obtained internally from the said subscriber unit.

16. The method as claimed in claim 15, wherein the said information obtained internally from the said subscriber unit comprises a time parameter.

17. The method as claimed in claim 16, wherein said information obtained internally from said subscriber unit comprises stored user selected information be displayed for preselected calling parties, and wherein said interpreting step includes evaluating said CMS information to determine the calling party and selecting the user selected information to be encoded when the content of a calling party filed corresponds to a preselected calling party.

18. A wireless subscriber unit for communicating with a wireless network comprising:
   at least one telephony interface for connecting to at least one standard telephony device;
   at least one transceiver for establishing a communication link with said wireless network; and
   a controller for controlling said subscriber unit, said controller comprising:
      means for decoding a wireless message containing coded information received by said transceiver in order to extract said coded information;
      means for encoding said information into a new message recognizable to said at least one standard telephony device; and
      means for sending said new message to said at least one standard telephony device via at least one telephony interface.

19. A wireless subscriber unit for communicating with a wireless network comprising:
   at least one telephony interface for connecting to at least one standard telephony device;
   at least one transceiver for establishing a communication link with said wireless network;
   a controller for extracting call management services (CMS) information from a wireless message received by said transceiver and for encoding said information into a new message recognizable to said at least one standard telephony device; and
   a signal processor for sending said new message to said at least one standard telephony device via at least one telephony interface.

20. A subscriber unit as claimed in claim 19, wherein said controller comprises a first controller extracting said CMS information;
   a second controller for encoding said information into said new message; and
   said signal processor comprises a DSP for FSK modulating signals applied to said telephone subscriber line.

21. A subscriber unit as claimed in claim 19 further comprising a user definable directory for storing calling party information entered by the user corresponding to user selected calling parties, and wherein said controller includes said user stored calling party information in said encoded message for received messages from said user selected calling parties.

22. A subscriber unit as claimed in claim 21 further comprising an internal clock or timing apparatus from which a time parameter is obtained to be included in said new message.

23. A subscriber unit comprising:
   at least one wireless transceiver;
   a subscriber line interface circuit (SLIC);
   at least one jack coupling a telephone subscriber line to said SLIC;
   a controller adapted to carry out the method of claim 1.

24. A subscriber unit comprising:
   at least one wireless transceiver;
   a subscriber line interface circuit (SLIC);
   at least one jack coupling a telephone subscriber line to said SLIC;
   a controller adapted to carry out the method of claim 2.

25. A subscriber unit comprising:
   at least one wireless transceiver;
   a subscriber line interface circuit (SLIC);
   at least one jack coupling a telephone subscriber line to said SLIC;
   a controller adapted to carry out the method of claim 4.

26. A subscriber unit comprising:
   at least one wireless transceiver;
   a subscriber line interface circuit (SLIC);
   at least one jack coupling a telephone subscriber line to said SLIC;
   a controller adapted to carry out the method of claim 5.

27. A subscriber unit comprising:
   at least one wireless transceiver;
   a subscriber line interface circuit (SLIC);
   at least one jack coupling a telephone subscriber line to said SLIC;
   a controller adapted to carry out the method of claim 7.

28. A subscriber unit comprising:
   at least one communication interface for communicating with a communications network via a medium;
   a subscriber line interface circuit (SLIC);
   at least one jack coupling a telephone subscriber line to said SLIC;
   a controller adapted to carry out the method of claim 12.

29. A subscriber unit comprising:
   at least one communication interface for communicating with a communications network via a suitable medium;
   a subscriber line interface circuit (SLIC);
   at least one jack coupling a telephone subscriber line to said SLIC; and
   a controller adapted to carry out the method of claim 8.

30. A subscriber unit comprising:
   at least one communication interface for communicating with a communications network via a suitable medium;
   a subscriber line interface circuit (SLIC);
   at least one jack coupling a telephone subscriber line to said SLIC; and a controller adapted to carry out the method of claim 9.

31. A subscriber unit comprising:

at least one communication interface for communicating with a communications network via a suitable medium;

a subscriber line interface circuit (SLIC);

at least one jack coupling a telephone subscriber line to said SLIC; and a controller adapted to carry out the method of claim 11.

32. A subscriber unit comprising:

at least one communication interface for communicating with a communications network via a suitable medium;

a subscriber line interface circuit (SLIC);

at least one jack coupling a telephone subscriber line to said SLIC; and a controller adapted to carry out the method of claim 15.

33. A subscriber unit comprising:

at least one communication interface for communicating with a communications network via a suitable medium;

a subscriber line interface circuit (SLIC);

at least one jack coupling a telephone subscriber line to said SLIC; and a controller adapted to carry out the method of claim 16.

34. A subscriber unit comprising:

at least one communication interface for communicating with a communications network via a suitable medium;

a subscriber line interface circuit (SLIC);

at least one jack coupling a telephone subscriber line to said SLIC; and a controller adapted to carry out the method of claim 22.

* * * * *